United States Patent [19]

Casella

[11] Patent Number: 4,492,712

[45] Date of Patent: Jan. 8, 1985

[54] USE OF HYDROLYZED WHEY PRODUCTS IN FERMENTED SAUSAGES

[75] Inventor: Linda J. Casella, Ithaca, N.Y.

[73] Assignee: Corning Glass Works, Corning, N.Y.

[21] Appl. No.: 542,704

[22] Filed: Oct. 17, 1983

[51] Int. Cl.³ ............................................. A23L 1/31
[52] U.S. Cl. ..................................... 426/59; 426/646; 426/652
[58] Field of Search ............... 426/59, 583, 646, 652, 426/657, 802

[56] References Cited

U.S. PATENT DOCUMENTS

| | | | |
|---|---|---|---|
| 3,930,056 | 12/1975 | Feminella et al. | 426/646 |
| 4,161,552 | 7/1979 | Melachouris | 426/646 |
| 4,165,391 | 8/1979 | Rolison | 426/583 X |
| 4,238,513 | 12/1980 | Satz | 426/646 X |
| 4,259,363 | 3/1981 | Lauck et al. | 426/646 |
| 4,293,583 | 10/1981 | Farr et al. | 426/657 |
| 4,362,750 | 12/1982 | Swartz | 426/646 X |

FOREIGN PATENT DOCUMENTS

| | | | |
|---|---|---|---|
| 964106 | 3/1975 | Canada | 426/646 |
| 0029503 | 6/1981 | European Pat. Off. | 426/41 |

Primary Examiner—Arthur L. Corbin
Attorney, Agent, or Firm—B. D. Voyce

[57] ABSTRACT

An extender for fermented sausage products based on hydrolyzed whey or hydrolyzed whey fractions is provided. The extender is equivalent to, but less expensive than, extenders used in the prior art, such as nonfat dry milk, and exhibits functional properties in the finished product, including the properties of reducing the product's pH and water activity.

16 Claims, 1 Drawing Figure

USE OF HYDROLYZED WHEY PRODUCTS IN FERMENTED SAUSAGES

CROSS-REFERENCE TO RELATED APPLICATIONS

The use of hydrolyzed whey or a hydrolyzed whey fraction as a component of a comminuted meat product is described and claimed in copending and commonly assigned application Ser. No. 542,748, filed of even date in the name of Linda J. Casella.

BACKGROUND OF THE INVENTION

1. Field of the Invention

This invention relates to fermented sausages and in particular to the use of hydrolyzed or a hydrolyzed whey fraction in such products.

2. Description of the Prior Art

As generally understood in the art, fermented sausages are those food products which include chopped, ground, pulverized or finely divided animal or poultry meat, meat by-products, or combinations thereof as a major component of the finished product and which are fermented by the addition of a microbial culture which digests components of the meat mixture to produce lactic acid. Fermented sausages represent a distinct class of products within the broader class of meat products known as comminuted meat products. They are generally characterized by a tangy, mildly acid taste, and are classified as either dry or semi-dry. The dry variety are shelf-stable at room temperatures; the semi-dry types require refrigeration.

Among the dry sausages are various varieties of salami, including the Italian alesandri, alpino, calabrese, genoa, and milano, the French arles, and the German and Hungarian types, as well as chorizos, frizzes, lola and lolita, lyons, and pepperoni. Representative of the semi-dry fermented sausages are the many varieties of cervelat or summer sausage, such as farmer, goettinger, goteborg, gothaer, holsteiner, land jaeger, and thuringer, as well as lebanon bologna and mortadella.

Fermented sausages generally include a meat component, a flavoring component, an extender component, a microbial culture, and in some cases, a coloring and/or a preservative component. This invention is directed to a new, inexpensive ingredient for use as the extender component, and in particular, to an extender which results in a product which cures to a lower pH and has a lower water activity.

In the past, expensive extenders, such as nonfat dry milk and hydrolyzed vegetable protein, have been used in comminuted meat products, including fermented sausages. Attempts to use less expensive extenders have been on-going. One series of attempts relating to comminuted meats in general has involved using whey, the by-product of cheese manufacturing, as an extender.

Whey typically contains, per liter, approximately 6 to 9 grams of protein, 45 to 50 grams of lactose, 6 to 8 grams of mineral salts, and 1 to 2 grams of fat. On a world-wide basis, the production of whey each year is estimated to be over 50 billion pounds. Whey thus represents a potentially important natural source of food for human consumption, provided it can be modified from its original state so as to make it palatable and functional in combination with other food ingredients.

Unfortunately, whey, as it is produced during the cheese manufacturing process, is of limited value as an extender, or for that matter, for anything else. Indeed, in the past, whey was regarded as a waste product and was discharged into sewers or streams and rivers. Today, however, because of increasing concerns over environmental pollution, much of the whey which is produced is subjected to some processing so that at a minimum it can be used as animal feed. Using whey as an animal feed, however, is a low value application and does not effectively take advantage of the true food value of whey.

Prior attempts to use whey as an extender for comminuted meats have suffered various disadvantages. Thus, U.S. Pat. No. 3,930,056 describes partially delactosing the whey and then fractionating the delactosed product by passing it through a bed containing a molecular sieve resin. The second fraction from the resin bed is used as an extender for cooked sausages. This procedure is both complicated and results in significant loss of food value as a result of the delactosing step.

U.S. Pat. No. 4,161,552 describes a multi-step process which includes adjusting the pH of a whey solution containing at least 20% acid whey or adjusting the pH and adding a divalent metal ion, such as calcium, to a sweet whey solution to produce a precipitate which constitutes the extender. The extender was used in non-specific loaves and frankfurters.

U.S. Pat. No. 4,259,363 describes combining whey derived materials, such as those described in U.S. Pat. No. 3,930,056, supra, with up to 50% casein or its salts to produce a meat extender for non-specific loaves. U.S. Pat. No. 4,165,391, although not directly concerned with meat extenders, describes a meat-related use for whey in which a whey-derived material is mixed with 50–80% hydrolyzed vegetable protein and 10–25% yeast autolysate to produce a meaty flavoring agent for addition to soups, gravies, snack foods, seasoning mixes and the like.

European Patent Application 0029503 describes culturing whey protein with a yogurt-type fermentation culture, blending the resulting product with such materials as whey protein concentrate, nonfat dried milk, sodium caseinate or corn syrup solids and spray-drying the blend to produce the desired extender. The extender can be used in tangy comminuted meat products, such as fermented sausages.

SUMMARY OF THE INVENTION

It is an object of the invention to provide a whey-based extender for fermented sausages which overcomes the problems in the prior art and which is easy to prepare, retains the food value of the lactose component of whey and exhibits functional properties in the finished sausage, including the properties of reducing the product's pH and water activity.

In accordance with the invention, it has been found that when the lactose component of whey or a whey fraction is hydrolyzed, the resulting product is especially useful as an extender for fermented sausages. In particular, it has been found that extenders composed of hydrolyzed whey or a hydrolyzed whey fraction exhibit excellent functional properties in fermented sausages including the properties of emulsification, overall binding and flavor-enhancement. In contrast, whey or whey fractions which have not been subjected to hydrolysis do not exhibit these properties.

Moreover, it has been found quite surprisingly that the pH and water activity for fermented sausages containing hydrolyzed whey or a hydrolyzed whey fraction is significantly reduced compared to the pH and water activity for fermented sausages containing other types of extenders. Although not wishing to be bound to any particular theory of operation, it is believed that the lower pH results from the metabolism of the glucose component of the hydrolyzed whey by the fermentation culture and that the lower pH in turn produces a lower water activity during the dry room phase of the fermented sausage manufacturing process. Reduced pH and water activity are important parameters to fermented sausage manufacturers because they generally correlate with enhanced consumer preference for the sausage's taste and texture and an extended sausage shelf-life.

As described in detail below, hydrolyzed whey materials work so successfully as an extender for fermented sausages that they can be used to replace such expensive extenders as nonfat dry milk without any significant perceived differences in the color, texture, flavor and general acceptance of the final product. In view of the low cost of whey, this represents an effective approach to reducing the cost of fermented sausages. It also represents a practical way to utilize the food value in whey.

In accordance with one aspect of the invention, a fermented sausage is provided which comprises:

a. a meat or meat by-product containing mixture suitable for making a fermented sausage, the mixture including a microbial fermentation culture; and b. an extender comprising hydrolyzed whey or a hydrolyzed whey fraction, which extender has a protein content of from about 2 to about 90 percent on a dry weight basis and which had, before hydrolysis, a lactose content of from about 5 to about 85 percent on a dry weight basis, which lactose is at least about 30 percent hydrolyzed.

In accordance with another aspect of the invention, a method for extending fermented sausages is provided which comprises admixing, with a meat or meat by-product containing mixture, suitable for making a fermented sausage, which mixture includes a microbial fermentation culture, an extender comprising hydrolyzed whey or a hydrolyzed whey fraction, which extender has a protein content of from about 2 to about 90 percent on a dry weight basis and which had, before hydrolysis, a lactose content of from about 5 to about 85 percent on a dry weight basis, which lactose is at least about 30 percent hydrolyzed.

In accordance with a further aspect of the invention, a method for reducing the pH and water activity of a fermented sausage is provided which comprises admixing hydrolyzed whey or a hydrolyzed whey fraction which has a protein content of from about 2 to about 90 percent on a dry weight basis and which had, before hydrolysis, a lactose content of from about 5 to about 85 percent on a dry weight basis, which lactose is at least about 30 percent hydrolyzed, with a meat or meat by-product containing mixture, suitable for making a fermented sausage, which mixture includes a microbial fermentation culture.

In certain preferred embodiments, the hydrolyzed whey or hydrolyzed whey fraction has a protein content of from about 8 to about 60 percent on a dry weight basis, and had, before hydrolysis, a lactose content of from about 20 to about 85 percent on a dry weight basis, which lactose is at least about 40 percent hydrolyzed.

In other preferred embodiments, the hydrolyzed whey or hydrolyzed whey fraction has a protein content of from about 8 to about 20 percent on a dry weight basis, and had, before hydrolysis, a lactose content of from about 60 to about 80 percent on a dry weight basis, which lactose is at least about 70 percent hydrolyzed.

As used herein, the term "whey" means whey as obtained from a cheese manufacturing process, i.e., whole whey. The term "whey fraction" applies to whey which has had one or more constituents either wholly or partially removed. Examples of the more common whey fractions include, by way of illustration only, whey permeate, which is whey from which a substantial amount of protein has been removed, typically by ultrafiltration; demineralized whey, which is whey from which part or all of the mineral (inorganic) salts have been removed; and whey protein concentrate, which is the protein-enriched fraction obtained by ultrafiltration (whey permeate, of course, is the other fraction).

Also, as used herein, the expression "meat or meat by-product" encompasses all types of materials resulting from the slaughtering of animals and poultry. Examples of the more commonly used meat or meat by-products used in fermented sausages include, by way of illustration only, beef, beef trim, pork, pork trim, pork livers, pork jowls, chicken, turkey, veal and lamb. Particularly preferred meat or meat by-products for use with the present invention constitute one or more kinds of skeletal muscle meat or skeletal muscle meat and poultry meat.

In general, hydrolysis of the whey or whey fraction can be accomplished by any known means. Thus, hydrolysis can be carried out by chemical methods or enzymatic methods which, in the latter case, can utilize either soluble or immobilized enzymes. Enzymatic hydrolysis is preferred, and the use of immobilized enzymes is most preferred.

DESCRIPTION OF THE PREFERRED EMBODIMENTS

Figure 1:
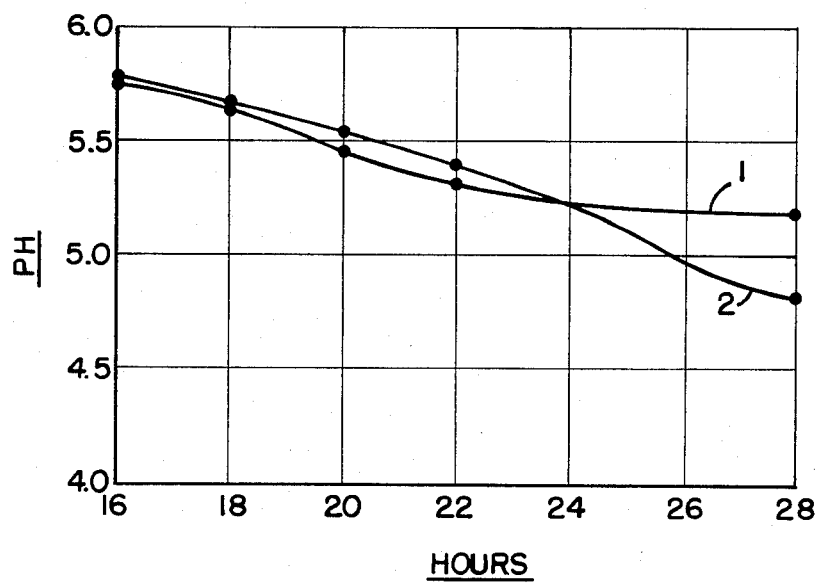
FIG. 1 shows the changes in pH during smokehouse processing of pepperoni-type fermented sausages having a nonfat dry milk extender (curve 1) and a hydrolyzed whey extender (curve 2).

As discussed above, the present invention provides a new extender comprising hydrolyzed whey or a hydrolyzed whey fraction for fermented sausages.

The composition and method of preparation of fermented sausages are well known to persons having ordinary skill in the art. By way of illustration only, a specific recipe and method of preparation for a pepperoni product are described below. The ingredients, quantities and methods of preparation used in the examples are not critical and other recipes and procedures, readily apparent to those of ordinary skill in the art, can be used for this product and for other products in the fermented sausage family of comminuted meats.

In accordance with the most preferred embodiment of the invention, the hydrolysis of the whey or whey fraction is performed by means of immobilized enzymes. Hydrolysis by this approach is well known to those having ordinary skill in the art. By way of illustration only, H. H. Weetall et al., *Biotechnol. Bioeng.*, 16, 295 (1974), reports the preparation of immobilized lactase and its use in the enzymatic hydrolysis of acid whey. The enzyme, isolated from both fungi and yeast, was immobilized on zirconia-coated porous glass particles. The substrate consisted of either an aqueous lactose solution or acid whey permeate.

Additionally, L. E. Wierzbicki et al., *Biotechnol. Bioeng.*, 16, 397 (1974), discusses the hydrolysis of lactose in acid whey using lactase immobilized on porous glass particles with emphasis on the preparation and characterization of a reusable catalyst for the production of low-lactose dairy products. Partially purified lactases from *Aspergillus niger*, *Lactobacillus helveticus*, and *Saccharomyces lactis* were immobilized on porous glass particles. The substrate consisted of acid whey powder which had been reconstituted in water to the appropriate solids concentration. In some instances, the reconstituted acid whey was deproteinized by heating in a boiling water bath for five minutes.

Moreover, H. H. Weetall et al., *Biotechnol. Bioeng.*, 16, 689 (1974), describes the preparation of immobilized lactase as part of continued studies on the enzymatic hydrolysis of lactose. A fungal lactase was employed, immobilized on zirconia-coated controlled-pore glass and porous titania particles. The resulting immobilized enzyme preparations were used for the hydrolysis of lactose in whole sweet whey, whole acid whey, acid whey ultrafiltrate (permeate), and pure lactose.

An especially useful process for hydrolyzing lactose is disclosed in copending and commonly assigned application Ser. No. 269,945 filed July 3, 1981, now U.S. Pat. No. 4,409,247, in the names of Jean-Luc A. Guy Baret and Luc A. Dohan. The process involves heating the whey to a temperature of from about 45° to about 90° C. for at least about 15 seconds, centrifuging the heated whey while it is still warm, and contacting the centrifuged whey with an immobilized lactase under conditions sufficient to hydrolyze at least a portion of the lactose contained therein into glucose and galactose.

With regard to the composition of the extender, its protein content is generally between from about 2 to about 90 percent on a dry weight basis and its lactose content, before hydrolysis, is generally from about 5 to about 85 percent on a dry weight basis. At least about 30 percent of the lactose in the extender must be hydrolyzed for the extender to exhibit binding, emulsifying and flavor-enhancing functions in the finished sausage, and to reduce the pH and water activity of the product.

The protein content of the extender preferably is from about 8 to about 60 percent on a dry weight basis, with from about 8 to about 20 percent on a dry weight basis being more preferred.

Preferably, the lactose content of the extender before hydrolysis was from about 20 to about 85 percent on a dry weight basis. More preferably, the lactose content of the extender before hydrolysis was from about 60 to about 80 percent on a dry weight basis.

The lactose in the extender preferably is at least about 40 percent hydrolyzed; more preferably, at least about 70 percent of such lactose is hydrolyzed.

In an especially preferred embodiment, the protein content of the extender is from about 8 to about 60 percent on a dry weight basis and the extender had, before hydrolysis, a lactose content of from about 20 to about 85 percent on a dry weight basis, which lactose is at least about 40 percent hydrolyzed. Most preferably, such lactose is at least about 70 percent hydrolyzed.

In another especially preferred embodiment, the protein content of the extender is from about 8 to about 20 percent on a dry weight basis and the extender had, before hydrolysis, a lactose content of from about 60 to about 80 percent on a dry weight basis, which lactose is at least about 40 percent hydrolyzed, and most preferably at least about 70 percent hydrolyzed.

Without intending to limit it in any manner, the present invention will be more fully described by the following examples which compare the extender of the invention with prior art extenders and which illustrate certain preferred embodiments of the invention. In particular, in Example 1, comparison tests are presented employing four extenders: (1) nonfat dry milk, (2) a nonhydrolyzed whey/casein blend (also referred to herein as "whey/casein blend"), (3) hydrolyzed whey and (4) demineralized hydrolyzed whey. Pepperoni type products were prepared using each of the four extenders. The products were compared for ease of manufacture and consumer appeal. As discussed in detail below, the two hydrolyzed whey extenders were found quite unexpectedly to perform as well as the commercial nonfat dry milk and non-hydrolyzed whey/casein blend extenders with regard to these variables.

Examples 2 and 3 illustrate the reduced pH and water activites achieved through the use of lactose-hydrolyzed whey. The extenders used in these examples were nonfat dry milk (control extender) and hydrolyzed whey whose pH had been raised to approximately 6.0 so as to demonstrate that the reduced pH of the final product was due to the composition of the hydrolyzed whey and not simply its lower initial pH in comparison to nonfat dry milk.

The nonfat dry milk used in the tests was "Superheat Nonfat Dry Milk", sold by Land O'Lakes, Inc., Eau Claire, Wis. This product, as described by the manufacturer, is specifically formulated for use, in among other things, sausage products. Its composition, according to the manufacturer, is:

| Ingredient | Weight Percent |
| --- | --- |
| Protein | 35.00% |
| Moisture | 3.50% |
| Carbohydrate | 51.00% |
| Butterfat | 0.80% |
| Minerals (Ash) | 8.60% |
| Whey Protein Nitrogen | 1.00 mg per gm |

The non-hydrolyzed whey/casein blend used was Savorlac 600, sold by Western Dairy Products, San Francisco, Calif. According to the manufacturer, this product is formulated from whey and edible casein for use in non-specific sausages. The manufacturer describes its composition as follows:

| Ingredient | Weight Percent |
| --- | --- |
| Protein (N × 6.38 as is) | 35.0% |
| Minerals (as ash) | 7.7% |
| Lactose | 51.0% |
| Fat | 1.5% |
| Moisture | 4.0% max. |

The hydrolyzed whey used in the exemplary tests was supplied as a spray-dried powder by Corning BI-Osystems, Corning Glass Works, Corning, N.Y. The lactose originally present was approximately 90 percent hydrolyzed. The composition of this powder was typically:

| Ingredient | Weight Percent |
| --- | --- |
| Protein | 14.0% ± 2% |
| Ash | 10.0% ± 2% |

| Ingredient | Weight Percent |
|---|---|
| Lactose | 10.0% ± 2% |
| Glucose | 30.0% ± 2% |
| Galactose | 30.0% ± 2% |

The demineralized hydrolyzed whey was also supplied as a spray-dried powder by Corning BIOsystems, Corning Glass Works, Corning, N.Y. The lactose originally present was approximately 90 percent hydrolyzed and the extent of demineralization was about 50 percent. The composition of this powder typically was:

| Ingredient | Weight Percent |
|---|---|
| Protein | 14.0% ± 2% |
| Ash | 6.0% ± 2% |
| Lactose | 9.0% ± 2% |
| Glucose | 31.0% ± 2% |
| Galactose | 31.0% ± 2% |

Both of these powders typically included some moisture, e.g., 4–6%, and a small amount of fat.

Using these extenders, pepperoni sausages were prepared and tested as described in the following examples.

EXAMPLE 1

Four batches of pepperoni sausages were prepared having the following composition, typical for products of this type.

| Ingredient | lbs/cwt |
|---|---|
| Lean Pork Trim (20% Fat) | 73.0 |
| Beef Trim (50% Fat) | 27.0 |
| | 100.0 |
| Salt | 3.0 |
| Dextrose | 0.75 |
| Prague Powder | 0.25 |
| Liquid Pepperoni Seasoning | 0.5 |
| Starter Culture | as required |
| Extender | 3.5 |

Each batch was made with one of the four extenders described above. Manufacturing and processing parameters were held constant for the four batches. In particular, the same starter culture, Lactobacillus, was used for each batch.

The sausages were prepared in a standard way by freeze tempering and then grinding the meat (½" plate); mixing the meats, salt, dextrose, and other ingredients together; regrinding the mixture (⅛" plate); stuffing the ground product into fibrous casings; incubating the stuffed sausages at 90° F. until a pH of approximately 5.0 was reached; smoking the sausages with natural smoke and then steam until a 130° F. internal temperature was reached; and drying the sausages in a dry room until a yield of approximately 70% was reached.

No processing difficulties or differences among the four extenders were noted in manufacturing the sausages. The demineralized hydrolyzed whey was found to be somewhat more hygroscopic than the other extenders with a tendency to clump together rather than being a free-flowing powder. The finished pepperoni products, however, were free of any clumps.

The pH before and after the incubation at 90° F. and the pH after the dry room processing for each of these products were as follows:

| | | pH | | |
|---|---|---|---|---|
| | | Before 90° F. Incubation | After 90° F. Incubation | After Dry Room Processing |
| 3.5% | Nonfat Dry Milk | 6.33 | 5.10 | 4.93 |
| 3.5% | Whey/Casein Blend | 6.30 | 5.02 | 4.87 |
| 3.5% | Hydrolyzed Whey | 6.01 | 4.86 | 4.53 |
| 3.5% | Demineralized Hydrolyzed Whey | 6.18 | 4.78 | 4.46 |

As shown in this table, the hydrolyzed whey products, at all stages of processing, gave products having a lower pH than the products using conventional extenders.

Analysis of the four batches of sausages showed them to be very similar in composition (moisture, protein, fat). The results of the analysis are shown in Table I.

TABLE I

| PEPPERONI ANALYSIS | | | |
|---|---|---|---|
| DESCRIPTION | % MOISTURE | % PROTEIN | % FAT |
| 3.5% Nonfat Dry Milk | 26.1 | 20.5 | 46.3 |
| 3.5% Whey/Casein Blend | 29.6 | 23.2 | 40.4 |
| 3.5% Hydrolyzed Whey | 29.2 | 22.3 | 41.4 |
| 3.5% Demineralized Hydrolyzed Whey | 31.5 | 21.5 | 37.4 |

The pepperoni products were sliced and vacuum-packaged for subsequent sensory evaluation. All four products exhibited good "sliceability" characteristics. No color, texture or appearance differences were noted either directly after preparation of the products or after one month of storage.

Taste panel evaluations showed all four products very acceptable in consumer appeal. The panelists made their evaluations in booths under normal lighting conditions. The products were served on crackers with no other condiments. The panelists rated the products on a 9-point hedonic scale and a composite score for each product was calculated as the mean score of the panelists after analysis of variance (elimination of panelists more than 1.5 standard deviations from the mean). The results are shown in Table II.

TABLE II

| SENSORY PREFERENCE EVALUATION - PEPPERONI | | | | |
|---|---|---|---|---|
| PRODUCT | COLOR | TEXTURE | FLAVOR | GENERAL ACCEPTANCE |
| 3.5% Nonfat Dry Milk | 7.20 | 6.54 | 6.24 | 6.60 |
| 3.5% Whey/Casein Blend | 7.00 | 7.00 | 6.82 | 6.93 |
| 3.5% Hydrolyzed Whey | 7.53 | 7.23 | 7.12 | 7.53 |
| 3.5% Demineralized Hydrolyzed Whey | 7.13 | 7.08 | 6.71 | 7.00 |

Analysis of this data revealed no significant ($P > 0.05$) differences in preference for any of the products in any of the tested parameters (color, texture, flavor, general acceptance). Panelists commented that all the products were very similar with no detectable differences.

In sum, the hydrolyzed whey extenders were found to be equivalent to the nonfat dry milk and the non-hydrolyzed whey/casein blend extenders with regard to functionality, processing characteristics and consumer appeal in the representative pepperoni products.

EXAMPLE 2

This example illustrates the reduced pH and water activity achieved by using a hydrolyzed whey extender instead of a conventional extender.

Two batches of pepperoni were prepared following the procedures described in Example 1. One of these batches used nonfat dry milk as an extender. The other used hydrolyzed whey (described above) whose pH had been raised to approximately 6.0, using sodium hydroxide. The pH of the hydrolyzed whey extender was raised so as to be able to isolate the pH changes due to the composition of the hydrolyzed whey, as opposed to pH effects due to the intrinsically lower pH of hydrolyzed whey as compared to nonfat dry milk.

The composition of the pepperoni sausages was identical to that used in Example 1 except that 70 pounds of lean pork trim having 18% fat was used instead of 73 pounds of lean pork trim having 20% fat; 30 pounds of beef trim having 52% fat was used instead of 27 pounds of beef trim having 50% fat; and 0.50 pounds of dextrose was used rather than 0.75 pounds.

So as to be able to follow the pH changes for these products, somewhat lower than normal smokehouse temperatures were used. The specific smokehouse procedure employed was as follows:

| | |
|---|---|
| 80° F./Static Steam | 23 Hours |
| 100/96° F. | 1 Hour |
| 115/110° F. | 1 Hour |
| 130/122° F. | 1 Hour |
| 150/140° F. | 2 Hours |
| Hot Shower | 5 Minutes |
| Ambient Temperature | 40 Minutes |

After smokehouse processing, the products were placed in a dry room for eleven days. The dry room temperature and relative humidity were approximately 50° F. and 75%, respectively.

The processing yields for the two products as measured during dry room processing were as follows:

| | % Yield | | | |
|---|---|---|---|---|
| | Day 0 | 3 | 7 | 11 |
| Nonfat Dry Milk | 95.2 | 85.7 | 76.7 | 70.7 |
| Hydrolyzed Whey (pH 6.0) | 94.4 | 83.1 | 74.0 | 68.1 | where "% Yield" was defined as:
$$\% \text{ Yield} = \frac{\text{Processed Weight}}{\text{Initial Raw Weight}} \times 100.$$

As shown by these data, the nonfat dry milk and hydrolyzed whey products had essentially equivalent yields.

The water activities for the two products measured both during smokehouse and dry room processing were as follows:

| | Time | | | | |
|---|---|---|---|---|---|
| | Smokehouse | | Dry Room | | |
| | 16 Hrs. | 28 Hrs. | Day 0 | 7 | 11 |
| Nonfat Dry Milk | 0.962 | 0.971 | 0.986 | 0.956 | 0.952 |
| Hydrolyzed Whey (pH 6.0) | 0.982 | 0.982 | 0.975 | 0.955 | 0.928 |

These data demonstrate that the hydrolyzed whey product had a lower final water activity than the nonfat dry milk product. In general, this means that whey-based products can be expected to have a longer shelf-life than products using the conventional extender.

The pH before and after smokehouse processing and the final pH after dry room processing for each of the products were as follows:

| | pH | | |
|---|---|---|---|
| | Before Smokehouse | After Smokehouse | After Dry Room |
| Nonfat Dry Milk | 6.2 | 5.2 | 5.0 |
| Hydrolyzed Whey (pH 6.0) | 6.1 | 4.8 | 4.7 |

As shown by these measurements, the product using hydrolyzed whey exhibited a greater drop in pH during smokehouse processing and a greater overall pH drop than the product using nonfat dry milk.

The time course of the pH changes for the products containing nonfat dry milk (curve 1) and hydrolyzed whey (curve 2) is shown in FIG. 1 for hours 16 through 28 of the smokehouse process. As can be seen in this Figure, the pH of the two products were approximately equal up to about 24 hours. At about 24 hours, however, the pH of the hydrolyzed whey product began to decrease rapidly in comparison to the pH of the nonfat dry milk product, so that by 28 hours (the end of the smokehouse process), the hydrolyzed whey product had a pH which was almost 0.4 pH units less than the pH of the nonfat dry milk product.

The time courses shown in FIG. 1 are believed to be due to the fact that up to about 24 hours, the fermentation cultures in both the nonfat dry milk and hydrolyzed whey products were primarily digesting the dextrose included in the raw sausage mixture. After 24 hours, the pH of the nonfat dry milk decreased only slightly because the dextrose had been essentially consumed. The pH of the hydrolyzed whey product, however, continued to decrease because the culture was able to switch from digesting dextrose to digesting the glucose component of the hydrolyzed whey.

In sum, this example demonstrates that the use of a hydrolyzed whey extender results in a final product having a lower pH and a lower water activity than an identical product produced with a conventional extender.

EXAMPLE 3

This example further illustrates the effects on pH of using a hydrolyzed whey extender rather than a conventional extender.

Two batches of pepperoni were prepared using the recipe and procedures of Example 1. One batch used nonfat dry milk as the extender; the other batch used hydrolyzed whey (described above) whose pH had been adjusted to approximately 6.0, using sodium hydroxide.

The changes in pH for each of the products during incubation at 70° F. were monitored and the following data recorded:

| | pH | | | | | |
|---|---|---|---|---|---|---|
| | Hour 0 | 20 | 23 | 26 | 28 | 44 |
| Nonfat Dry Milk | 6.1 | 5.9 | 5.7 | 5.5 | 5.4 | 4.9 |
| Hydrolyzed Whey (pH 6.0) | 6.1 | 6.0 | 5.6 | 5.6 | 5.4 | 3.9 |

As in Example 2, both products initially fermented at approximately the same rate. After this initial phase, however, the pH of the hydrolyzed whey product dropped significantly below the pH of the nonfat dry milk product. As discussed above, this drop in pH for the hydrolyzed product is believed to be due to the availability of glucose for fermentation once the dextrose included in the raw mixture has been consumed.

It is to be understood that the foregoing detailed description is given merely by way of illustration and that many variations thereof may be made without departing from the spirit or scope of the invention. For example, the definition of the extender is deemed to cover reconstituted hydrolyzed whey products and reconstituted hydrolyzed whey fractions. Additionally, such definition includes synthetic hydrolyzed whey and synthetic hydrolyzed whey fractions, i.e., any composition obtained by combining whey or other protein with appropriate amounts of lactose and/or glucose and galactose whereby such composition meets the requirements of the extender as defined. Also, although the hydrolyzed whey products have been illustrated as the sole extenders in the representative products discussed, it is to be understood that they can be used in combination with other extenders, for example, in combination with nonfat dry milk. Other variations will be apparent to one having ordinary skill in the art.

What is claimed is:

1. A fermented sausage product comprising:
   a. a meat or meat by-product containing mixture suitable for making a fermented sausage product, the mixture including a microbial fermentation culture; and
   b. an extender comprising lactose hydrolyzed whey which has a protein content of from about 2 to about 90 percent on a dry weight basis and which had, before hydrolysis, a lactose content of from about 5 to about 85 percent on a dry weight basis, which lactose is at least about 30 percent hydrolyzed.

2. The fermented sausage product of claim 1 in which the lactose is at least about 40 percent hydrolyzed.

3. The fermented sausage product of claim 1 in which the lactose is at least about 70 percent hydrolyzed.

4. The fermented sausage product of claim 1 in which the protein content of the hydrolyzed whey is from about 8 to about 60 percent by weight.

5. The fermented sausage product of claim 1 in which the protein content of the hydrolyzed whey is from about 8 to about 20 percent by weight.

6. The fermented sausage product of claim 1 in which the hydrolyzed whey had, before hydrolysis, a lactose content of from about 20 to about 85 percent by weight.

7. The fermented sausage product of claim 1 in which the hydrolyzed whey had, before hydrolysis, a lactose content of from about 60 to about 80 percent by weight.

8. The fermented sausage product of claim 1 in which the hydrolyzed whey has a protein content of from about 8 to about 60 percent by weight and had, before hydrolysis, a lactose content of from about 20 to about 85 percent by weight, which lactose is at least about 40 percent hydrolyzed.

9. The fermented sausage product of claim 1 in which the hydrolyzed whey has a protein content of from about 8 to about 20 percent by weight and had, before hydrolysis, a lactose content of from about 60 to about 80 percent by weight, which lactose is at least about 40 percent hydrolyzed.

10. The fermented sausage product of claim 1 which also contains at least one extender in addition to lactose hydrolyzed whey.

11. A method for extending a fermented sausage product which comprises admixing with a meat or meat by-product containing mixture, suitable for making a fermented sausage product, which mixture includes a microbial fermentation culture, an extender comprising lactose hydrolyzed whey which has a protein content of from about 2 to about 90 percent on a dry weight basis and which had, before hydrolysis, a lactose content of from about 5 to about 85 percent on a dry weight basis, which lactose is at least about 30 percent hydrolyzed.

12. The method of claim 11 in which the lactose is at least about 40 percent hydrolyzed.

13. The method of claim 11 in which the lactose is at least about 70 percent hydrolyzed.

14. The method of claim 11 in which the hydrolyzed whey has a protein content of from about 8 to about 60 percent by weight and had, before hydrolysis, a lactose content of from about 20 to about 85 percent by weight, which lactose is at least about 40 percent hydrolyzed.

15. The method of claim 11 in which the hydrolyzed whey has a protein content of from about 8 to about 20 percent by weight and had, before hydrolysis, a lactose content of from about 60 to about 80 percent by weight, which lactose is at least about 40 percent hydrolyzed.

16. The method of claim 11 in which at least one extender in addition to lactose hydrolyzed whey is admixed with the meat or meat by-product containing mixture.

* * * * *